(12) United States Patent
Meketa

(10) Patent No.: US 7,984,514 B1
(45) Date of Patent: Jul. 19, 2011

(54) SECURE OPERATION OF TRANSITORY COMPUTER APPLICATIONS

(75) Inventor: Deneb Meketa, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1408 days.

(21) Appl. No.: 11/483,792

(22) Filed: Jul. 10, 2006

(51) Int. Cl.
*H04N 7/16* (2006.01)

(52) U.S. Cl. ....... 726/30; 726/3; 713/1; 713/2; 713/150; 713/155

(58) Field of Classification Search .......... 713/1–2, 713/150, 155; 726/30, 3; 709/201; 358/404; 369/94
See application file for complete search history.

(56) References Cited

U.S. PATENT DOCUMENTS

| 5,268,768 A * | 12/1993 | Terasaka ................ 358/404 |
| 5,822,291 A * | 10/1998 | Brindze et al. .......... 369/94 |
| 6,675,295 B1 * | 1/2004 | Greenberg et al. ........ 713/2 |

* cited by examiner

*Primary Examiner* — Thanhnga B Truong
(74) *Attorney, Agent, or Firm* — Fish & Richardson P.C.

(57) ABSTRACT

A security application is described for determining conditions within a computer application that would create the desire to allow or disallow access to certain system functions or features by the application. The security application analyzes the conditions and sets a lock that enables the application to perform only certain types of actions that would be considered secure by the security application.

19 Claims, 6 Drawing Sheets

SECURE OPERATION OF TRANSITORY COMPUTER APPLICATIONS

TECHNICAL FIELD

The present invention relates, in general, to computer software security, and, more particularly, to providing secure operation of transitory computer applications.

BACKGROUND OF THE INVENTION

Modern computers demonstrate their usefulness by the software applications that they run. In the days before extensive networking and the proliferation of the Internet, software applications were typically monolithic, relatively large-scaled and independent programs that were designed to do a single general task. Any data generated or obtained within the application was generally confined to that particular application. With the increased interconnectivity brought about by the Internet, larger applications may interact with transitory smaller applications which could exchange data with remote servers or other remote application, sometimes even without the computer user knowing that this communication interchange is even taking place. Such transitory applications typically are executed for a certain amount of time and eventually end either automatically or at the direction of the user. This interconnectivity, along with the existence of more nefarious applications, such as viruses, trojan horses, and the like, expose computer users to potential loss of data, damaged computers, or even losing money or credit standing through identity theft.

Because of the potential for loss and damage to computers, data, and property, processes and security software have been developed to minimize the potential losses by preventing unsafe applications from either operating or operating successfully. Firewalls attempt to prevent unauthorized access to computer systems; antivirus applications attempt to identify, destroy, and/or quarantine virus programs; and spyware programs attempt to locate and neutralize spyware that may be mining a user's computer for sensitive (or even not so sensitive, but equally personal) data. Thus, a considerable amount of research and technology has been dedicated to preventing unauthorized access to users' computers and disclosure of information located on those computers.

One area that has been addressed for increasing protection and security is in media files. When a file type represents media, such as an image, animation, sound, or the like, users of that file type generally do not expect that opening such files will expose them to any potential harm. These users view such files as containing only media. Users may, thus, develop a habit of opening media files without regard to the trustworthiness of their origin. This lack of suspicion can have great benefits for the free movement of information. However, sophisticated media file types may support embedded scripting commands, and, if a program that opens such files is not carefully written, the commands embedded in such files may perform actions that users would generally not expect or approve. Thus, a program that plays a media file type with embedded scripting commands should take precautions to protect users from unreasonable actions—i.e., such a program should avoid providing any mechanisms by which a creator of a media file can attack the computer or user information with that file. This is an important task for of what is known as a "user agent" program. User agents typically render media file types for users.

Another example system or application that benefits from more secure transactions are in the Web browser. Many modern web browsers offer to store or "remember" certain user information in order to make it easier or more convenient for a user to log into certain of his or her favorite Websites or Web applications. The user IDs and passwords that could be stored or remembered may provide access to data as insignificant as a log of jogging times that a user has amassed during various exercise sessions to critical data and control of the user's bank accounts and financial information. As various transitory applications, applets, or services (collectively "applications") are run on the user's computer, it is critical to make sure that these applications do not access any of the user's sensitive personal information and, more importantly, that they do not send that information to an unauthorized recipient.

Whenever a computer system introduces restrictions on the actions of various applications, whether indirectly, through proxy, such as a user agent program, or directly through the operating system, it is desirable to prevent only those actions that may cause harm to users, and to allow any actions that can never cause harm. This preserves the greatest possible set of capabilities for such applications while keeping the file type safe for users. Producers and users of such applications both typically desire a rich set of capabilities, but users generally demand safe applications. This tension dictates that a good security application should be constructed to permit the maximum set of capabilities without permitting harm to users.

Many computers may contain, or have access to, data that the user considers private. A user may typically wish that this private data not be shared with an anonymous party, such as the author or provider of a particular application, without the user's express consent. This private data may include presence information, names, or contents of files on the computer's local file systems; presence information, names, or contents of files on other computers in a private local network; configuration of the computer and any applications installed on it; personally identifying information about the user; passwords to various computer and non-computer systems; a history of the consumer's actions; and a considerable number of other forms of private data; or the like.

One type of action that a security system or application would likely prevent is the disclosure of any of the users' private data back to the creator or provider of the application. Such a disclosure becomes a risk whenever the set of embedded commands that the security application supports for any application type includes both the ability to obtain private data from the user or the user's computer, and the ability to send data using a network. An application with both of these capabilities could obtain private data from the user or the user's computer and then use a network to send that private data back to the creator or provider of that application. One tension that a security application or system may resolve is that, on one hand, it may be useful for some applications to be able to obtain private data from the user or the user's computer, and also useful for some applications to be able to send data using a network; but that, on the other hand, it may be dangerous to permit a single application to perform both of these actions.

One technology that has been used to secure data from unauthorized disclosure is referred to as "tainting." Tainting, in general, is the process of tagging or marking the origin of every single piece of data that comes into the computer system and preventing certain of that data from flowing out of the system. A tainting security application or system checks each of the tags or marks on each piece of data and determines which of those pieces of data may be either accessed, transmitted, or other such operation. Tainting, while allowing a flexible security system, is extremely complex and problematic. Problems arise because the tag or mark should be preserved throughout the life of that data, whether the data is modified, copied, sent through some application programming interface (API), or otherwise changed or processed in any manner. If the tag or mark is not preserved, then it would be very easy to defeat the tainting security system simply by copying or only slightly modifying the information The problem with this is that it is very difficult to implement correctly. The complexity of monitoring each piece of data throughout its life and attempting to preserve all of the tainting tags and marks makes it very easy to introduce bugs or flaws into a system that already has tainting built into it. The complexity also makes it very difficult for programmers to understand as well, because the tainting system can produce very baffling failures that are difficult to reproduce because everything is dependent on a very sensitive set of conditions.

BRIEF SUMMARY OF THE INVENTION

Representative embodiments of the present invention are related to the determination of conditions within a computer application that would create the desire to allow or disallow access to certain system functions or features by the application. The security application analyzes the conditions and sets a lock that enables the application to perform only certain types of actions that would be considered secure by the security application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
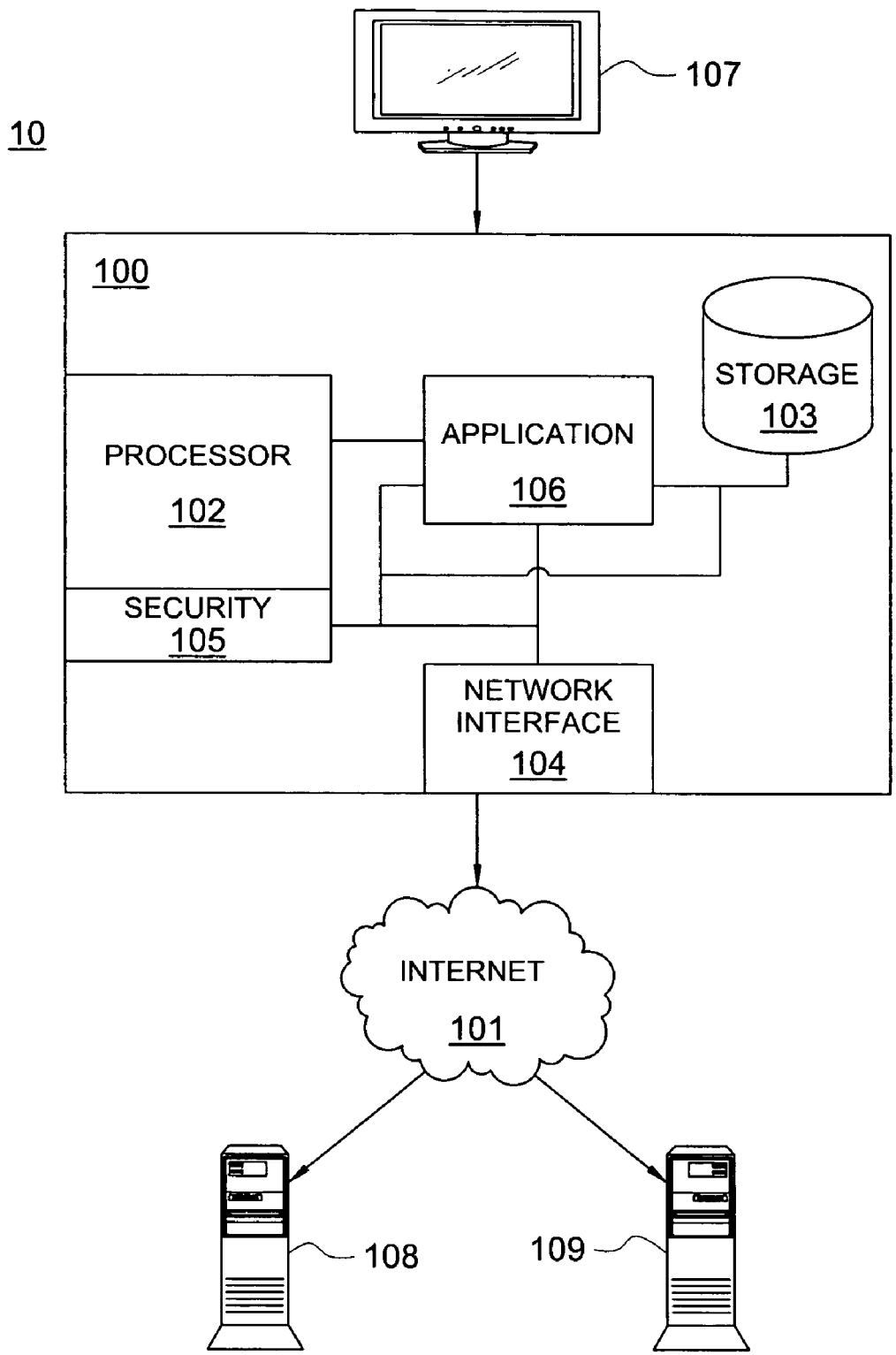
FIG. 1 is a block diagram illustrating a computer network including a user computer configured according to one embodiment of the present invention.

FIG. 1 is a block diagram illustrating computer network 10 including user computer 100 configured according to one embodiment of the present invention. User computer 100 with display 107 connect to Internet 101 via network interface 104. In normal operation, the user runs various programs and applications, such as word processing programs, spreadsheet programs, game programs, graphics programs, and the like. When accessing Internet 101, the user could operate a Web browser on user computer 100 that interprets the Hypertext Markup Language (HTML) documents to display various Web pages, or operates multimedia players or plugins, such as Adobe Systems Incorporated's, FLASH PLAYER®, which operates to play media files or rich internet applications (RIA), RealNetworks, Inc.'s REALPLAYER™, Microsoft Corp.'s WINDOWS MEDIA PLAYER™, or the like, which operate to play media.

Modern software packages usually include some kind of online support, such that the programs themselves access Internet 101 and check their home sites for software updates, verify licenses, and the like. The user may or may not know or be made aware that these software products are accessing Internet 101 to obtain or exchange this information. However, in order to prevent an application running on user computer 100 from improperly accessing personal data on user computer 100 and sending it to a remote server, such as servers 108 and 109 via Internet 101, user computer 100 operates security application 105. It should be noted that security application 105 may be a separate program running within user computer 100 or may be a system utility that either comes with or has been added to the operating system or administrative software of user computer 100.

When application 106 is loaded into memory for execution, it first registers with security application 105. The registration process allows application 106 to declare which rights it maintains for operating or accessing the system functionality of user computer 100. Once the declaration has been made, security application 105 monitors the operation of application 106 and provides instructions executed by processor 102 that prohibit application 106 from operating or accessing the system functionality that was not declared. For example, it may be advantageous for application 106 to access remote server 109 in order to receive program updates. This advantageous process would support application 106 accessing Internet 101 through network interface 104. Therefore, when application 106 starts up, it declares to security application 105 that it will access network interface 104 in order to access remote server 109 through Internet 101.

If application 106 attempts to access personal information in storage 103, security application 105 intercepts the access request and prohibits application 106 from accessing storage 103 in violation of its initial declaration. In this manner, application 106 is able to perform its beneficial task of interacting with Internet 101 and remote server 109, but user computer 100 is secured from personal information being read from storage 103 and broadcast over Internet 101.

It should be noted that many different system functions may be a part of the declaration process for applications. In the example above, only two such functions were mentioned: accessing storage 103 for personal data, and accessing network interface 104 for performing communications with Internet 101. However, the various additional and/or alternative embodiments of the present invention are not limited only to two available choices for system functionality. Available system functions could include accessing certain memory locations, deleting from memory or from certain memory locations, writing to memory or certain memory locations, accessing system configuration information, modifying system administration programs, forming an ad hoc network with a neighboring computer, and the like. The various embodiments of the present invention may provide for an application to declare one or more system functions, it may alternatively form the multiple functions into discrete groups that the application could only choose one group or another, it may further detail certain combinations of system functions that may not be declared by any one application. Any combination of selections for system functions would be operable with the various embodiments of the present invention.

It should further be noted that, instead of providing for a declarative system, where each application explicitly declares which system functionality it selects to have access to, a dynamic system may be used, where the security system, such as security application 105, monitors the activities of the application and, based on those activities, security application 105 would assign available system functionality or a combination thereof to the running application. For purposes of example, FIG. 1 may also be used to describe this more dynamic alternative embodiment. As application 106 starts up, security application 105 would begin monitoring each activity that application 106 performs, in this alternative embodiment. On start up, one of the first hidden tasks that application 106 performs is to connect to remote server 109 to check for any updates to the software. When application 106 accesses network interface 104 to establish connection to Internet 101, security application 105 assigns a category of operation that would allow application 106 to access Internet 101 through network interface 104, but would prohibit application 106 from accessing storage 103 to obtain personal information. With this dynamic system, the application would not need the additional coding to implement the declarative system.

Figure 2:
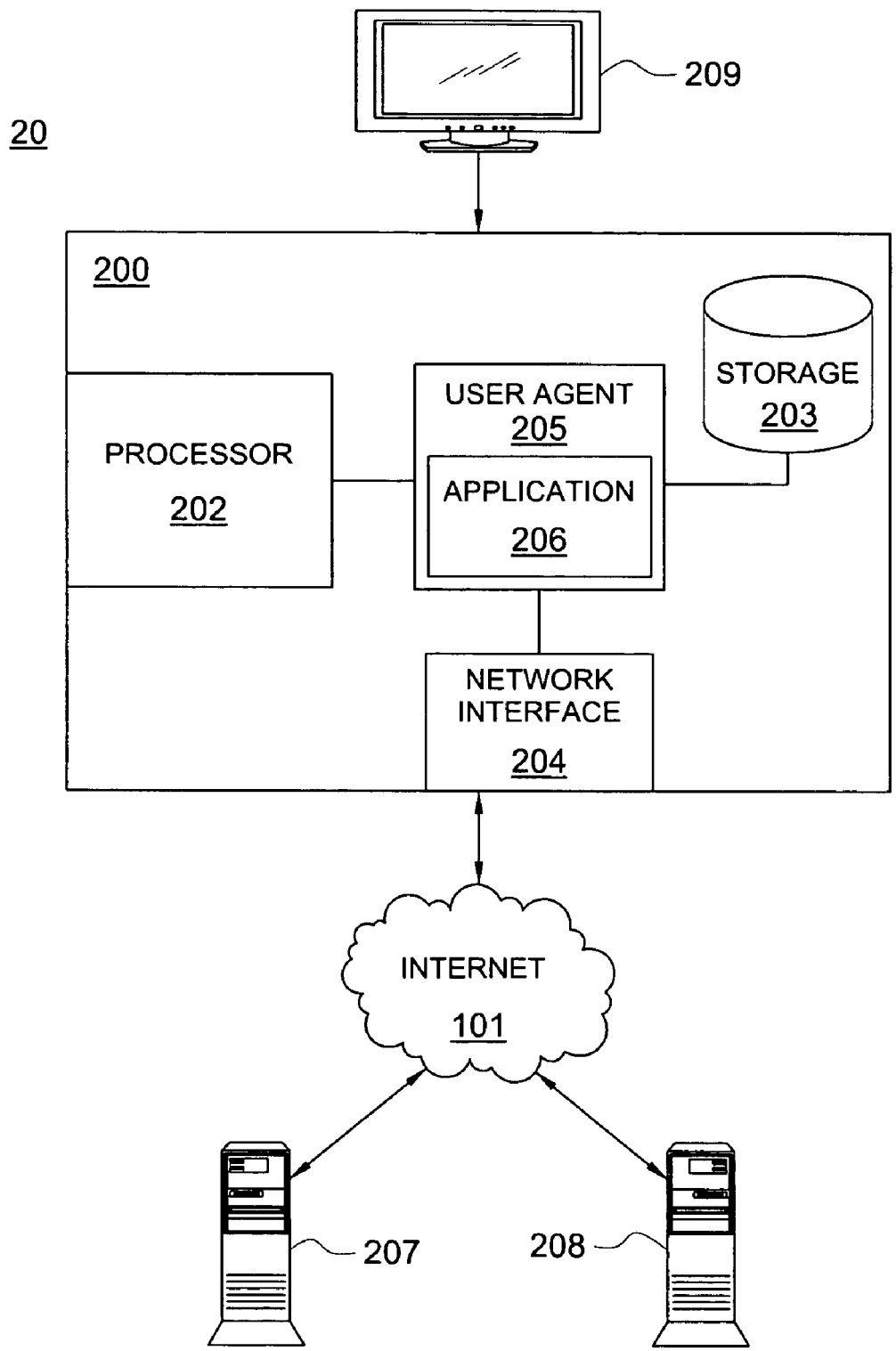
FIG. 2 is a block diagram illustrating a computer network including a user computer configured according to one embodiment of the present invention.

FIG. 2 is a block diagram illustrating computer network 20 including user computer 200 configured according to one embodiment of the present invention. Unlike security application 105 (FIG. 1), which operates as a separate security application either as a part of the operating system or working in concert with the operating system or other administrative software, the secure aspect of the present invention, as implemented in the presently described embodiment of FIG. 2, operates in a standard helper program, such as user agent 205. A user agent is a client application used with a particular network protocol for retrieving and rendering or assisting to retrieve and render content. Examples, of various types of user agents include Web browsers, media players, plug-ins, and other programs—including assistive technologies—that help in retrieving and rendering content. Thus, a user agent will often act as a container within which the application will execute.

Returning to FIG. 2, when application 206 is called up to run, user agent 205 is activated and runs or renders application 206 within its container. Processor 202 executes the instructions of user agent 205 and the instructions of application 206, to the extent that user agent 205 permits those instructions. The security features available within user agent 205 operate similarly to those described in FIG. 1 (both in the declarative and dynamic embodiments). For example, if user agent 205 is configured to operate in a declarative way according to one embodiment of the present invention, as application 206 begins to run, it declares to user agent 205 what system functions it will maintain access to. For purposes of the example represented in FIG. 2, application 206 selects to access personal data in storage 203 and retain authority to modify such data and store the modified data back into storage 203. Once the declaration has been made, user agent 205 monitors the activity of application 206 and its interaction with user computer 200. Requests for personal information within storage 203 will be allowed. However, if application 206 requests access to network interface 204 in order to access Internet 101, user agent 205 prohibits application 206 from accessing network interface 204.

It should be noted that, in the declarative embodiments, if an application, such as application 206, attempts to declare system features that combine to create a security risk, user agent 205 would consider application 206 an invalid application and shut it down before it can begin normal operation.

As a complementary example of FIG. 2, if user agent 205 is configured to operate in a dynamic way according to one embodiment of the present invention, as application 206 begins to run, user agent 205 monitors its actions. Depending on the actions that application 206 performs, user agent 205 creates a profile for application 206 that includes acceptable system features and prohibited system features. For example, if application 206 begins by accessing personal information from storage 203, user agent 205 would establish the profile for application 206 to prohibit any access to network interface 204 for connecting to Internet 101. Alternatively, if application begins by accessing network interface 204 to connect to remote servers 207 and/or 208 through Internet 101, user agent would establish the profile to prohibit access to personal information on storage 203. If application 206 would thereafter attempt to access one of the prohibited system features or functions, user agent 205 would intercept and prevent such access, thus, preserving the security of user computer 200.

It should be noted that in additional and/or alternative embodiments of the present invention, instead of performing the declaration or dynamic assignment of system functionality access rights during the runtime of a particular application, the various embodiments of the present invention may be implemented to determine the access rights of the application before runtime. Without executing the application, the security system could analyze the code or script of the application to determine the various system features and functionality that should be accessible to the application.

Applying this additional and/or alternative embodiment to FIG. 1, security application 105 is programmed to parse through the code of application 106 prior to execution to analyze the system functionality that application 106 will use. After analyzing the code of application 106, security application 105 would determine that application 106 should be able to access network interface 104 in order to connect to Internet 101, but should be prohibited from accessing personal information in storage 103. In similar application to FIG. 2, prior to executing application 206, user agent 205 analyzes the code and operability of application 206 to determine that it should be allowed to access personal information stored in storage 203, but prohibited from accessing network interface 204 to connect to Internet 101. In this manner of implementation, the access rights are determined prior to executing the application. This pre-approval process adds a layer of security to the user's computer.

Figure 3A:
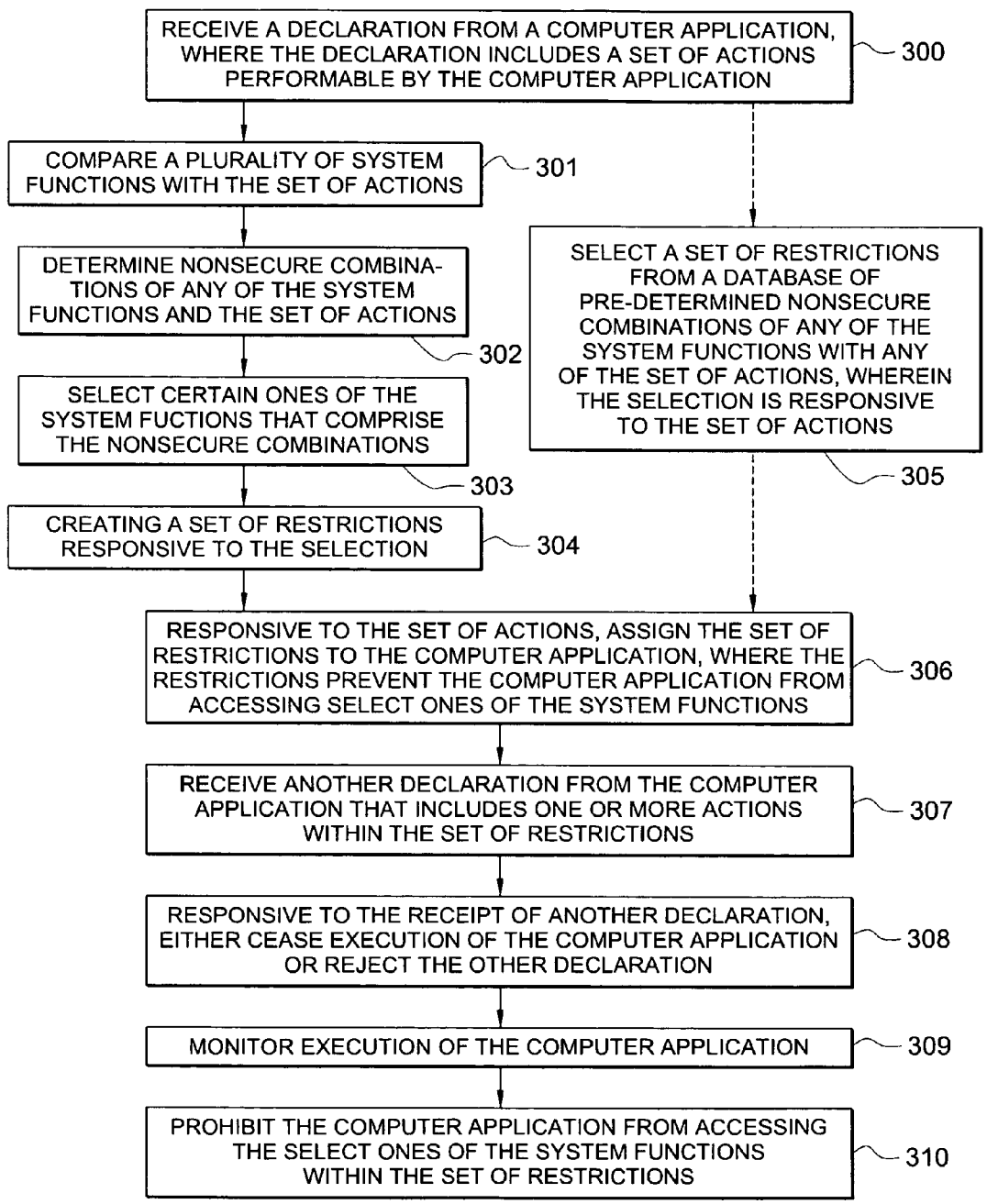
FIG. 3A is a flowchart illustrating example steps executed to implement one embodiment of the present invention.

FIG. 3A is a flowchart illustrating example steps executed to implement one embodiment of the present invention. In step 300, a declaration is received from a computer application, where the declaration includes a set of actions performable by the computer application. A plurality of system functions are compared with the set of actions in step 301. Non-secure combinations of any of the system functions and the set of actions are determined in step 302. Non-secure or unsafe combination of system functions are any two or more system functions that, when available for operation to a single application, may present opportunities for the application to perform a set of actions that places the security or safety of the user's computer at risk. For example, allowing an application the combination to access sensitive personal information and also access a network interface would provide a means for the application to copy such personal information and transmit over the network with the user's knowledge or approval. Another example of a non-secure or unsafe combination is providing an application a combination of the ability to access and modify parts of the operating system stored on the user's computer. In a virus example, a virus may gain access to and modify the Master Boot Record on the computer hard disk, thus, potentially damaging or deleting critical system attributes.

In step 303, certain ones of the system functions that comprise the non-secure combinations are selected. A set of restrictions is created, in step 304, responsive to the selection. Responsive to the set of actions, the set of restrictions are assigned, in step 306, to the computer application, where the restrictions prevent the computer application from accessing select ones of the system functions. For example, a particular application may be assigned a set of restrictions that includes no access to personal information, no modification of system files, and no modification of hardware configuration files. A different application may be assigned a set of restrictions that includes no access to the network interface; no access or modification rights for system files, and no access or modification of hardware configuration files. Various different combinations of such system functions may be compiled and assigned to particular applications. If, in step 307, another declaration is received from the computer application that includes one or more actions within the set of restrictions, the system will either cease execution of the computer application or reject the other declaration in step 308. In step 309, execution of the computer application is monitored. The computer application is prohibited from accessing the select ones of the system functions within the set of restrictions in step 310.

It should be noted that in alternative embodiments of the present invention, instead of the set of restrictions being created on an ad hoc basis, there would be a predetermined list of combinations of system functions that are non-secure. In such an embodiment, instead of executing steps 301-304, a set of restrictions are selected, in step 305, from a database of pre-determined non-secure combinations of any of the system functions with any of the set of actions, wherein the selection is responsive to the set of actions.

Figure 3B:
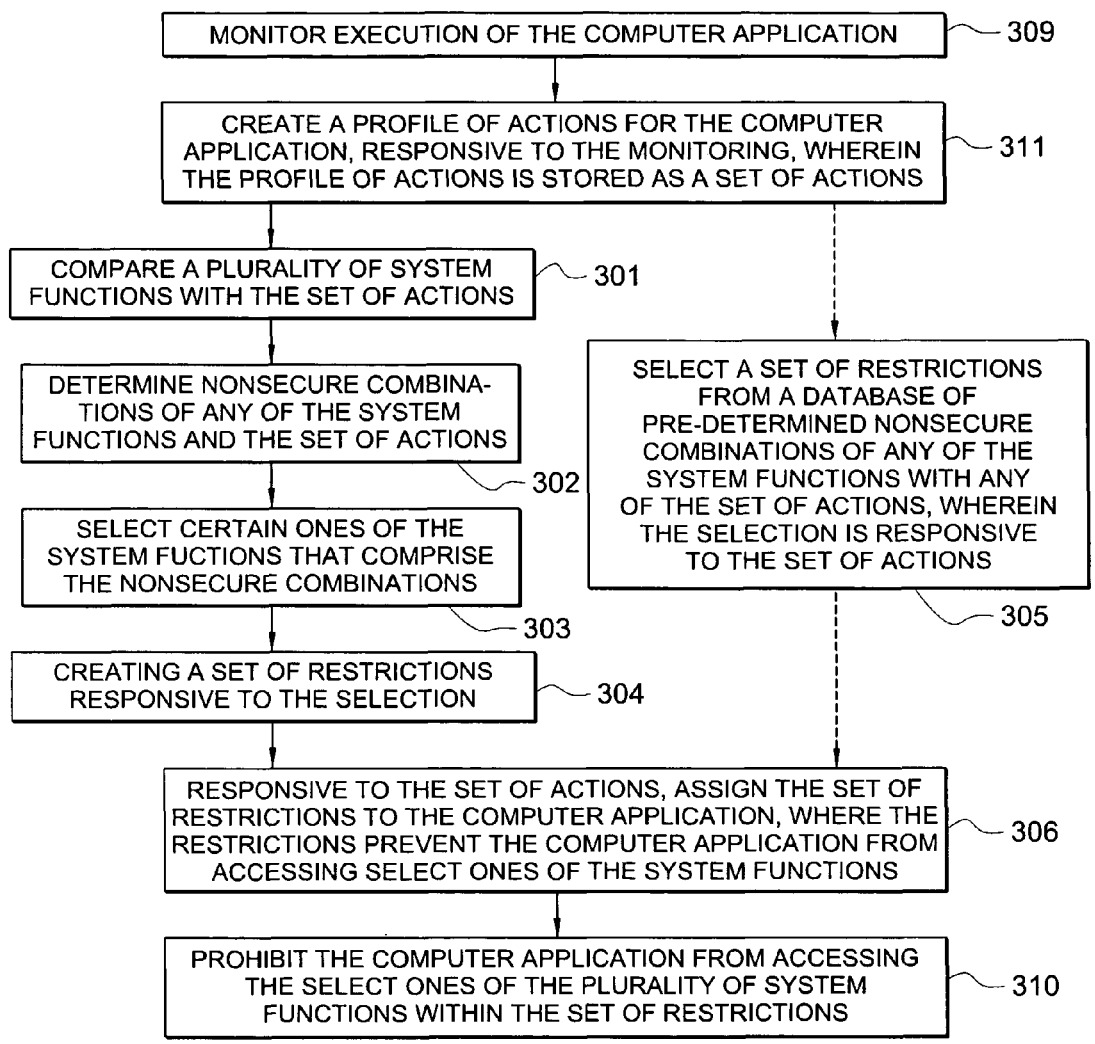
FIG. 3B is a flowchart illustrating example steps executed to implement one embodiment of the present invention.

FIG. 3B is a flowchart illustrating example steps executed to implement one embodiment of the present invention. Several of the steps executed in FIG. 3B were also executed in the embodiment described in FIG. 3A. Therefore, the same element numbers are used in those instances to avoid confusion. In step 309, execution of the computer application is monitored. A profile of actions is created, in step 311, for the computer application, responsive to the monitoring, wherein the profile of actions is stored as the set of actions. A plurality of system functions are compared with the set of actions in step 301. Non-secure combinations of any of the system functions and the set of actions are determined in step 302. In step 303, certain ones of the system functions that comprise the non-secure combinations are selected. A set of restrictions is created, in step 304, responsive to the selection. Responsive to the set of actions, the set of restrictions are assigned, in step 306, to the computer application, where the restrictions prevent the computer application from accessing select ones of the system functions. The computer application is prohibited from accessing the select ones of the system functions within the set of restrictions in step 310.

As with the example from FIG. 3A, a predetermined list of combinations of system functions that are non-secure may be used to select the set of restrictions, in step 305, instead of executing steps 301-304.

Figure 3C:
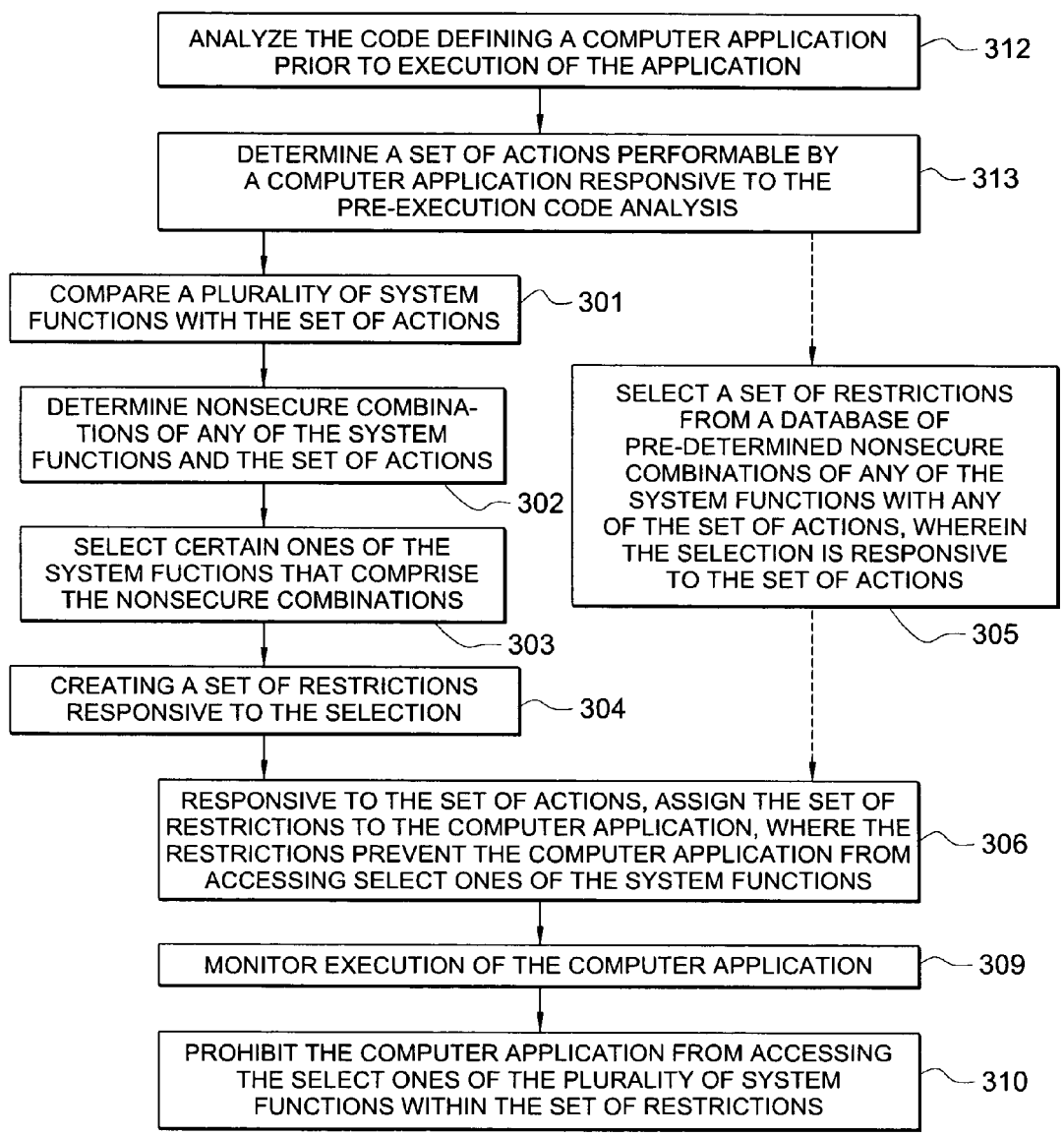
FIG. 3C is a flowchart illustrating example steps executed to implement one embodiment of the present invention.

FIG. 3C is a flowchart illustrating example steps executed to implement one embodiment of the present invention. Again, several of the steps from FIGS. 3A & 3B are executed in the embodiment described in FIG. 3C. In those instances, the same element numbers have been used to avoid confusion. In step 312, the code defining a computer application is analyzed prior to execution of the application. In step 313, a set of actions performable by a computer application is determined, responsive to the pre-execution code analysis. A plurality of system functions are compared with the set of actions in step 301. Non-secure combinations of any of the system functions and the set of actions are determined in step 302. In step 303, certain ones of the system functions that comprise the non-secure combinations are selected. A set of restrictions is created, in step 304, responsive to the selection. Alternatively, a set of restrictions are selected, in step 305, from a database of pre-determined non-secure combinations of any of the system functions with any of the set of actions, wherein the selection is responsive to the set of actions. Responsive to the set of actions, the set of restrictions are assigned, in step 306, to the computer application, where the restrictions prevent the computer application from accessing select ones of the system functions. In step 309, execution of the computer application is monitored. The computer application is prohibited from accessing the select ones of the system functions within the set of restrictions in step 310.

Figure 4:
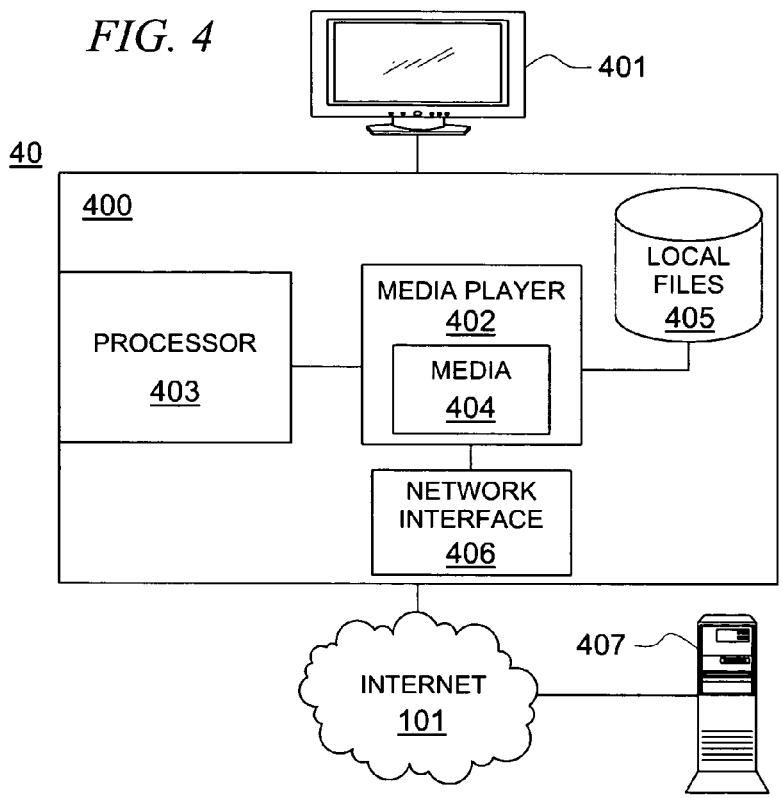
FIG. 4 is a block diagram illustrating a media player configured according to one embodiment of the present invention.

FIG. 4 is a block diagram illustrating media player 402 configured according to one embodiment of the present invention. Media player 402 is capable of obtaining private user data from local files 405 and also is capable of communicating with remote server 407 over Internet 101. Because allowing both system functions could jeopardize the security of the user of computer 400, media player 402 includes a security considerations as implemented by the presently-described embodiment. When a user desires to play a media file, such as media file 404, media player 402 is activated. Media file 404 is run within the container of media player 402. On start up, media file 404 declares to media player 402 that it will operate in the "access local files only" mode. This mode allows media player 402 to obtain personal information from local files 405, but signals media player 402 that media file 404 is not allowed to access Internet 101 through network interface 406. Therefore, if the script within media file 404 is written to access personal information on local files 405, but is also written to attempt to access Internet 101 through network interface 406, media player 402 would prohibit any access to network interface 406.

It should be noted that, as described in the previous examples, additional and alternative embodiments of the present invention could provide for media player 402 to assign a set of restrictions to media file 404 based on its observing media file 404 perform a set of actions. Further additional and alternative embodiments of the present invention could provide for media player 402 to analyze the set of actions operable by media file 404 without actually running or executing media file 404. In such an embodiment, the restrictions would be set prior to the application even executing.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 5:
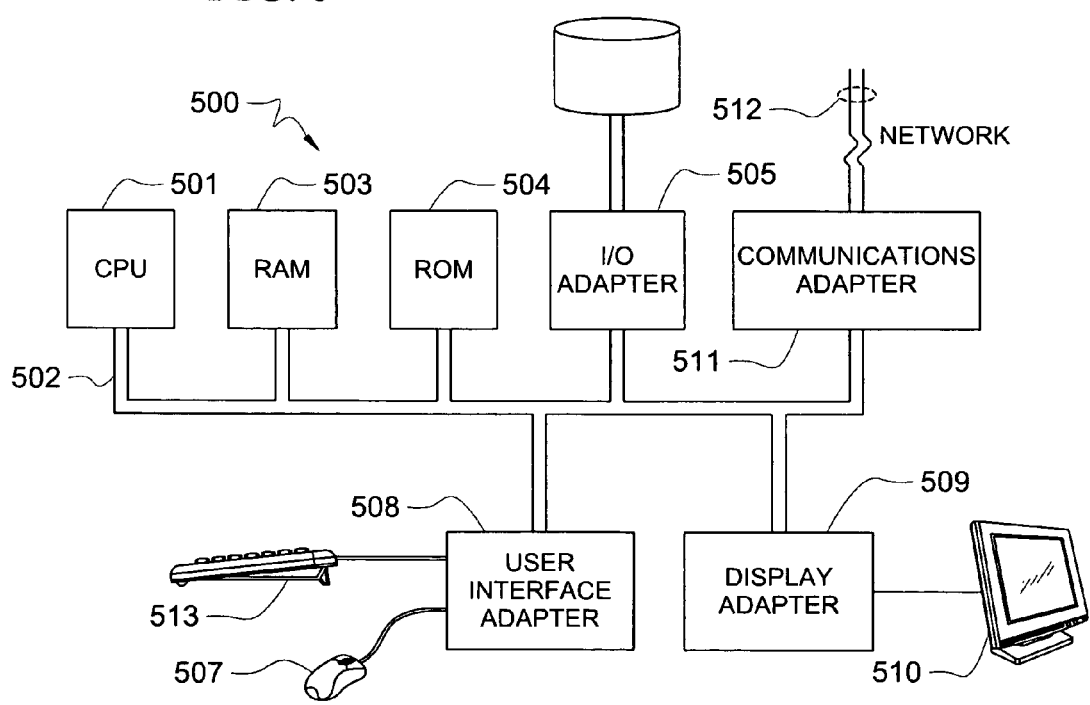
FIG. 5 illustrates a computer system adapted to use embodiments of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
identifying a computer application at a computer system, the computer system including local storage and being communicatively coupled to a network;
determining a set of actions performable by the computer application, the determined set of actions including at least a combination of read-accessing the local storage and transmitting to the network, said determining comprising receiving a declaration from the computer application, wherein the declaration includes the set of actions;
responsive to said determined set of actions, assigning said computer application a set of restrictions against access to select ones of a plurality of system functions, the set of restrictions including disallowing the computer application access to at least one of read-access to the local storage and transmission to the network, said assigning comprising
determining other non-secure combinations of the set of actions in addition to the combination of said read-accessing the local storage and said transmitting to the network,
selecting other ones of the plurality of system functions that enable the other non-secure combinations, and
creating the set of restrictions responsive to said selecting;
monitoring execution of said computer application;
prohibiting said computer application from accessing said select ones of said plurality of system functions within said set of restrictions;
receiving another declaration from the computer application, wherein the other declaration includes one or more actions within the set of restrictions; and
responsive to said receiving the other declaration, either ceasing execution of the computer application or rejecting the other declaration.

2. The method of claim 1 wherein said determining the set of actions comprises:
creating a profile of actions for said computer application, responsive to said monitoring, wherein said profile of actions is stored as said set of actions.

3. The method of claim 1 wherein said determining the set of actions comprises:
analyzing code defining said computer application prior to execution of said computer application; and
determining said set of actions responsive to said analyzing.

4. The method of claim 1 wherein said assigning comprises:
selecting said set of restrictions from a database of associated pre-determined non-secure combinations of said set of actions, wherein said selecting is responsive to said set of actions.

5. The method of claim 1 further comprising:
performing said method in a user agent application running on a user computer.

6. The method of claim 1, wherein said set of actions further comprises write-accessing restricted and un-restricted portions of the local storage, and said set of restrictions includes write access to the restricted portions of the local storage.

7. The method of claim 6, wherein the restricted portions of the local storage include system files or hardware configuration files.

8. A computer program product having a not-transitory computer readable medium with computer program logic recorded thereon, said computer program product comprising:
  code for determining a set of actions performable by a computer application, the determined set of actions including at least a combination of read-accessing a local storage and transmitting to a network, the code for said determining comprising code for receiving a designation from the computer application, wherein the designation includes identification of the set of actions;
  code for assigning, in response to said determined set of actions, said computer application a set of restrictions against access to one or more system functions, the set of restrictions including disallowing the computer application access to at least one of read-access to the local storage and transmission to the network, the code for said assigning comprising
  code for determining other non-secure combinations of the set of actions in addition to the combination of said read-accessing the local storage and said transmitting to the network,
  code for selecting other ones of the one or more system functions that enable the other non-secure combinations, and
  code for creating the set of restrictions responsive to said code for selecting;
  code for monitoring execution of said computer application;
  code for prohibiting, in response to said set of restrictions, said computer application from accessing said one or more system functions;
  code for receiving another designation from the computer application, wherein the other designation includes at least one action within the set of restrictions; and
  code for either halting execution of the computer application or for invalidating the other designation responsive to said code for receiving the other designation.

9. The computer program product of claim 8 wherein said code for determining the set of actions comprises:
  code for generating a profile of actions for said computer application, responsive to execution of said code for monitoring, wherein said profile of actions is stored as said set of actions.

10. The computer program product of claim 8 wherein said code for determining the set of actions comprises:
  code for analyzing code defining said computer application prior to execution of said computer application; and
  code for determining said set of actions responsive to execution of said code for analyzing.

11. The computer program product of claim 8 wherein said code for assigning comprises:
  code for selecting said set of restrictions from a database of pre-determined non-secure combinations of any of said set of actions, wherein said code for selecting is executable in response to said set of actions.

12. The computer program product of claim 8 wherein said computer program product is implemented in a user agent application executable on a user computer.

13. A system comprising:
  local storage;
  a data processor communicatively coupled to the local storage and to a network, the data processor to perform operations comprising:
  identifying a computer application to be executed by the data processor;
  determining a set of actions performable by the identified computer application, the determined set of actions including at least a combination of read-accessing the local storage and transmitting to the network, said determining comprising receiving a declaration from the computer application, wherein the declaration includes the set of actions;
  responsive to said determined set of actions, assigning said computer application a set of restrictions against access to select ones of a plurality of system functions, the set of restrictions including disallowing the computer application access to at least one of read-access the local storage and transmission to the network, said assigning comprising
  determining other non-secure combinations of the set of actions in addition to the combination of said read-accessing the local storage and said transmitting to the network,
  selecting other ones of the plurality of system functions that enable the other non-secure combinations, and
  creating the set of restrictions responsive to said selecting;
  monitoring execution of said computer application;
  prohibiting said computer application from accessing said select ones of said plurality of system functions within said set of restrictions;
  receiving another declaration from the computer application, wherein the other declaration includes one or more actions within the set of restrictions; and
  responsive to said receiving the other declaration, either ceasing execution of the computer application or rejecting the other declaration.

14. The system of claim 13, wherein operations for said determining the set of actions comprise:
  creating a profile of actions for said computer application, responsive to said monitoring, wherein said profile of actions is stored as said set of actions.

15. The system of claim 13, wherein operations for said determining the set of actions comprise:
  analyzing code defining said computer application prior to execution of said computer application; and
  determining said set of actions responsive to said analyzing.

16. The system of claim 13, wherein operations for said assigning comprise:
  selecting said set of restrictions from a database of associated pre-determined non-secure combinations of said set of actions, wherein said selecting is responsive to said set of actions.

17. The system of claim 13, wherein the computer application comprises a user agent application executed by said data processor.

18. The system of claim 13, wherein said set of actions further comprise write-accessing restricted and un-restricted portions of the local storage, and said set of restrictions includes write access to the restricted portions of the local storage.

19. The system of claim 18, wherein the restricted portions of the local storage include system files or hardware configuration files.

* * * * *